July 2, 1968    P. J. MOORE    3,390,578
SYSTEM FOR MAKING A SERIES OF TEMPERATURE MEASUREMENTS
Filed July 30, 1965    2 Sheets-Sheet 1
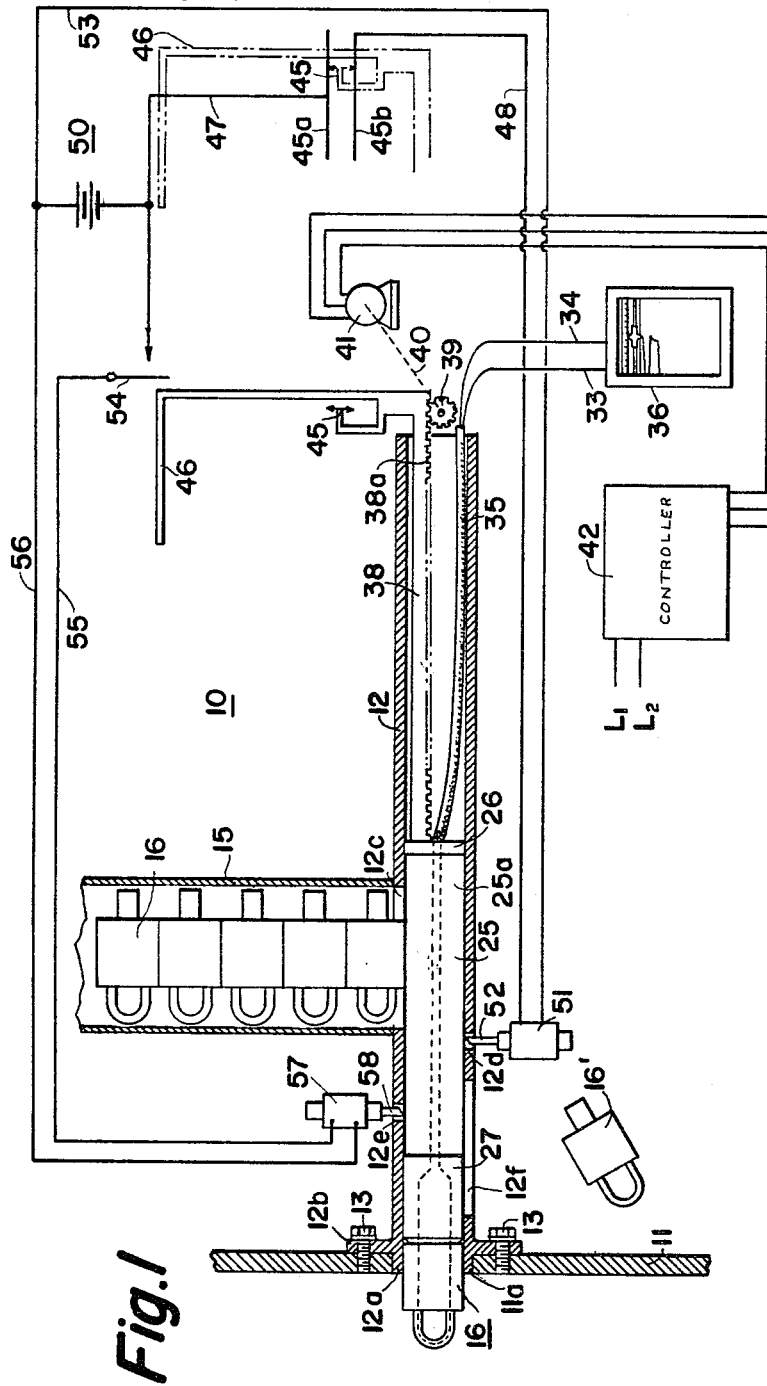
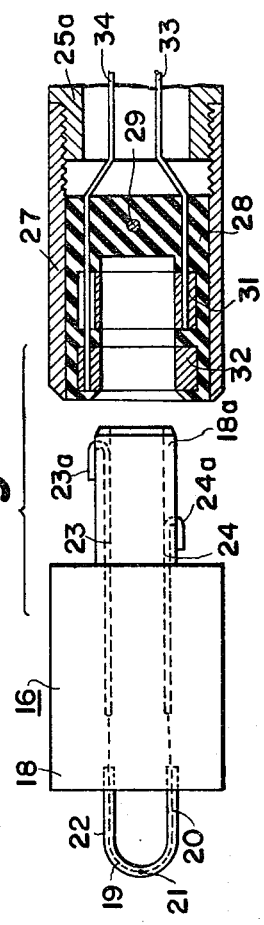

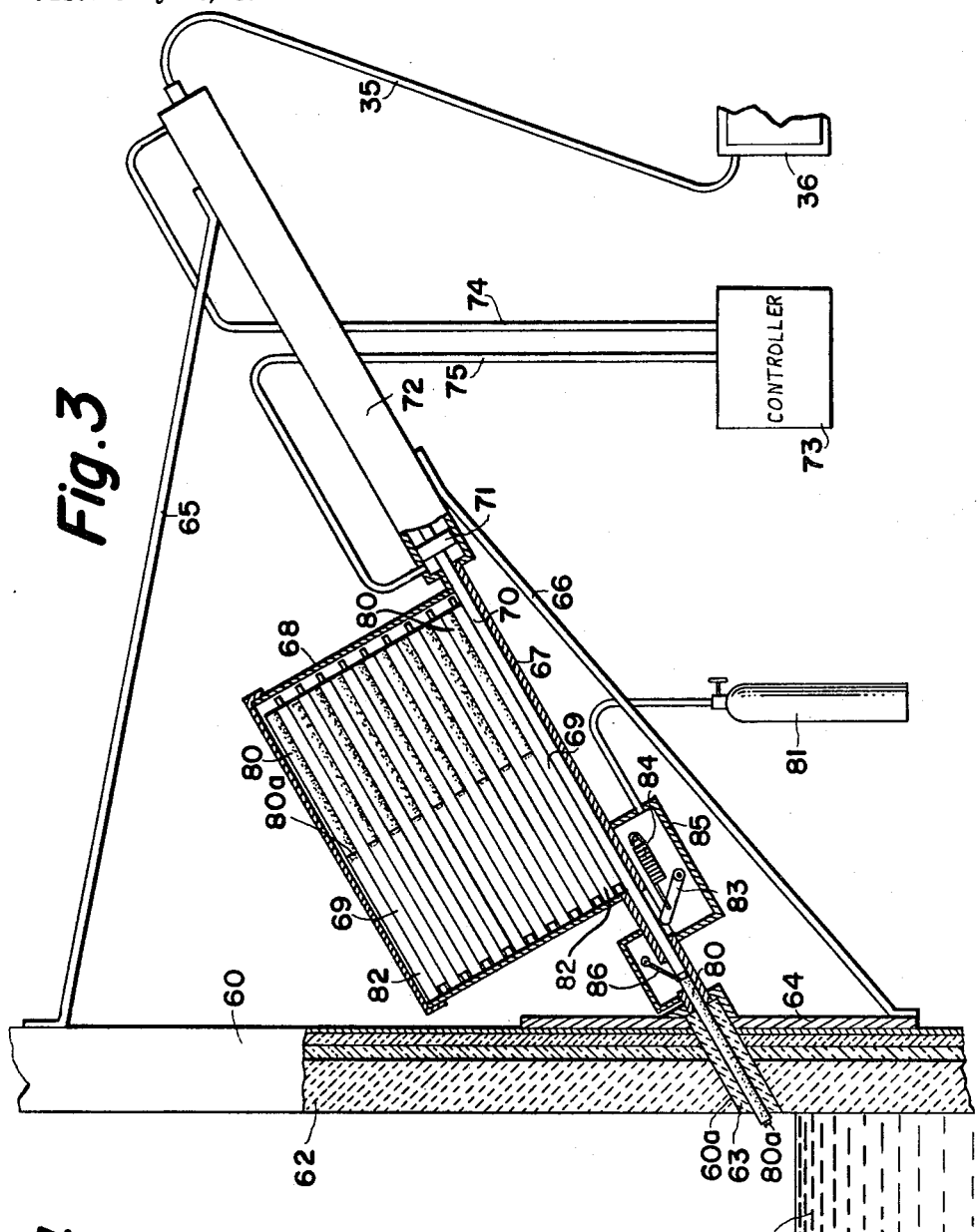
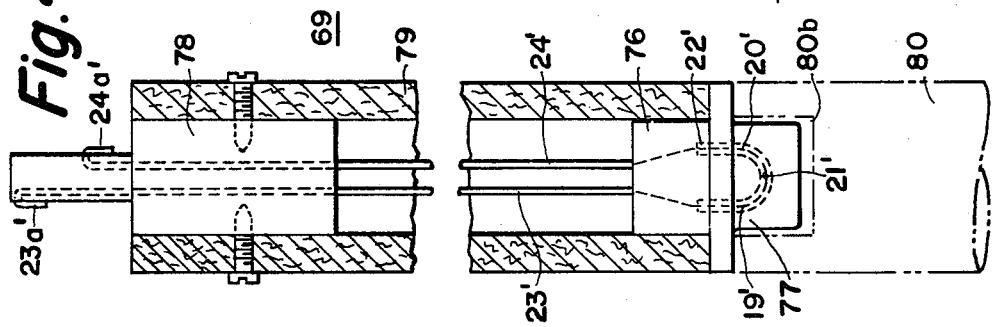

United States Patent Office 3,390,578
Patented July 2, 1968

3,390,578
SYSTEM FOR MAKING A SERIES OF
TEMPERATURE MEASUREMENTS
Philemon J. Moore, Jenkintown, Pa., assignor to Leeds
& Northrup Company, Philadelphia, Pa., a corporation of Pennsylvania
Filed July 30, 1965, Ser. No. 475,973
9 Claims. (Cl. 73—359)

ABSTRACT OF THE DISCLOSURE

A system for making a series of temperature measurements of a molten bath in a container wherein a plurality of expendable temperature-sensing units are adapted to be sequentially introduced into the container for making successive temperature measurements and wherein refractory plugs are interspersed in the succession of temperature-sensing units for plugging the opening in the container through which the temperature-sensing units are introduced by the temperature measurements.

---

This invention relates to a system for making a series of temperature measurements, and has for an object the provision of an improved method and apparatus for making a series of temperature measurements in a container at selected intervals and using a different temperature-sensing element for each temperature measurement.

In making high-temperature measurements, such as the measurements of a molten bath in a furnace or hot gas from a jet engine or the like, such measurements are frequently made with temperature-sensing elements which are destroyed during each measurement. A considerable amount of time is required to install and arrange the equipment in order to obtain a measurement of high temperature even though the temperature-sensing element is immediately destroyed during the measurement. It is frequently desirable to make a series of temperature measurements, sometimes in rapid succession, and, thus, it is desirable that a new temperature-sensing element be capable of being rapidly positioned for each succeeding temperature measurement. While various arrangements have been heretofore proposed for making continuous temperature measurements with the same temperature-sensing element, such arrangements have left something to be desired as it is extremely difficult to provide a temperature-sensing element which will withstand continuous exposure to high temperatures over any extended period. It is for this reason that the expendable temperature-sensing units of the type disclosed in Mead Patents Nos. 2,999,121 and 3,038,951, Moore Patent 3,024,295, Parker 3,048,642 and Robertson et al. 3,055,961 were developed. The present invention is directed to providing a method of and apparatus for making a series of temperature measurements in rapid succession with expendable temperature-sensing units, such as the type disclosed in the aforesaid patents.

In accordance with the present invention, there is provided a system for making a series of temperature measurements of a high-temperature fluid comprising the method of and means for feeding an expendable temperature-sensing unit into a housing communicating with an opening in a wall adjacent the high-temperature fluid, connecting the temperature-sensing unit with a temperature measuring system, inserting the temperature-sensitive end of the temperature-sensing unit through the opening and into the fluid for a temperature measurement thereof, disconnecting the used temperature measuring unit from the measuring circuit, removing the used temperature-sensing unit from the opening in the wall, and sequentially introducing additional temperature-sensing units into the housing, and repeating the foregoing steps for making succeeding temperature measurements of the high-temperature fluid.

In accordance with the further aspects of the invention, there is provided in a system for making a series of temperature measurements of a hot fluid or molten bath in a container, the method of and apparatus for feeding an expendable temperature-sensing unit into a housing communicating with an opening in the wall of the container above the molten bath and maintained closed by means of removable expendable plugs of refractory material, connecting the temperature-sensing unit with a temperature measuring system, inserting the temperature-sensitive end of the temperature-sensing unit through the opening in the wall and concurrently pushing the plug through the opening into the molten bath, and thereafter pushing the temperature-sensitive end into position for a temperature measurement of the bath, disconnecting the temperature-sensing unit from the measuring circuit, inserting a new expendable refractory plug into the housing behind the temperature-sensing unit, moving the refractory plug into the opening in the wall of the container to force the temperature-sensing unit through the opening and into the molten bath, and alternately introducing additional temperature-sensing unit and refractory plugs into the housing for making succeeding temperature measurements of the molten bath.

Further in accordance with the invention, there is provided a system for making a series of temperature measurements of material within a container. Such system comprises a tubular housing and means for attaching the housing in supported relation with an opening in a container holding the material, the temperature of which is to be measured. A reciprocable plunger is disposed within the housing and plug-in electrical connector means is carried by the plunger at one end thereof. Means is provided for inserting an expendable temperature-sensing element having a plug-in electrical connector engageable with that of the plunger into the housing and into the path of the reciprocable plunger. The system also includes means associated with the housing to control engagement and disengagement of the plug-in connector in accordance with the direction of travel of the plunger.

For a more detailed description of the present invention and for further objects and advantages thereof, reference is to be had to the following description taken in conjunction with the accompanying drawings in which:

FIG. 1 is a diagrammatic view of a system embodying the present invention;

FIG. 2 is a sectional view of an expendable temperature-sensing unit and mating electrical connectors of the type shown in FIG. 1;

FIG. 3 is a diagrammatic view of a modification of a system embodying the present invention; and FIG. 4 is a sectional view of an expendable temperature-sensing unit of the type utilized in the system of FIG. 3.

Referring to FIG. 1, there is illustrated a system 10 embodying the present invention for making a series of temperature measurements at selected intervals. The system illustrated in FIG. 1 is a particularly suited for making a series of temperature measurements in rapid succession of high-temperature fluids, such as exhaust gases from jet engines, rockets or the like or furnace gases.

In FIG. 1, there is illustrated a wall 11 which forms one wall of a duct through which the hot gas or the like passes. The wall 11 is provided with an opening 11a therethrough which is adapted to receive the discharge end 12a of a tubular housing 12. The housing 12 is adapted to be secured to the wall 11 preferably by a flange 12b through which extend screws 13. The screws 13 are adapted to be received in threaded openings in the wall 11. The tubular housing 12 is provided with a magazine 15 which is adapted to receive a series of expendable temperature-sensing units 16. The magazine 15 is aligned at its lower end with an opening 12c intermediate the ends of the housing 12. The magazine 15 is adapted to feed the expendable temperature-sensing units 16 in sequence into housing 12.

The temperature-sensing units 16 may best be seen in FIG. 2. Such units preferably are similar to the expendable units shown in FIG. 8 of the aforesaid Patent 3,048,-642. The units 16 as illustrated include a cylindrical body member 18 into which extend the ends of dissimilar thermocouple wires 19 and 20 of suitable material. One end of each of the thermocouple wires 19 and 20 is joined at 21 to form a measuring junction within a tube 22 of fused silica or quartz, or equivalent material. The opposite ends of the thermocouple wires 19 and 20 are connected to extension lead wires 23 and 24, the opposite ends of which are adapted to be bent over at 23a and 24a to provide plug-in contacts for the expendable temperature-sensing unit 16. The body 18 may be made of ceramic or wood, or any other suitable material, and the tubular extension 18a will preferably be made of a resilient material as disclosed in the aforesaid Patent 3,048,642. The tubular housing 12 is provided with a reciprocal plunger or manipulator 25, FIG. 1, which comprises a section of hollow pipe 25a having at one end a cross-head 26 and at the opposite end of a pipe coupling 27. As may be seen in FIG. 2, the coupling 27 is provided with a contact receptacle 28, which may be made of ceramic, dense rubber or other suitable material, and is held in the coupling 27 by means of a cross-pin 29. The connector block 28 supports a pair of electrical contact rings 31 and 32 which are respectively connected to extension lead wires 33 and 34. The extension lead wires 33 and 34 are contained within cable 35 and are adapted to connect to a temperature measuring instrument illustrated as a recorder 36 of the type well known in the art. The contacts 23a and 24a on the expendable unit 16 are adapted to engage respective ring contacts 31 and 32 on the plunger 25 when the unit 16 is plugged into the electrical connector means carried by the plunger 24.

The rear end of the plunger 25 is provided with an extension or rod structure 38 having a series of teeth 38a which are adapted to be engaged by a pinion 39 on a shaft 40 of a suitable driver motor 41. The drive motor 41 is of the reversible type and is adapted to be controlled from a suitable control circuit 42 which is energized from a line L-1, L-2. The particular control circuit may take various forms, the details of which do not form part of the present invention. It is sufficient for the control circuit 42 to provide, at selected times, a fixed length of reciprocable stroke for the plunger 25. The control circuit 42 may be actuated from a manual switch by the operator or it may be programmed by a timer or from a computer in accordance with a preselected program of operation.

As may be seen in FIG. 1, the rod 38 also supports contact means 45 and a switch actuator 46. The contact means 45 is adapted to complete a circuit between contacts 45a and 45b which are respectively connected to conductors 47 and 48. The opposite end of conductor 47 is connected to one side of a battery 50 and the opposite end of conductor 48 is connected to the coil of a solenoid 51 which is adapted to control a stop member 52 associated with an opening 12d in the housing 12. The opposite end of the coil of solenoid 51 is connected by conductor 53 to the opposite side of the battery 50. The solenoid 51 is of the type in which the armature or stop member 52 is spring-biased so that the stop is retracted when the solenoid is deenergized.

It will be seen that when the plunger 25 is in the rear position, the contacts 45 will be in the phantom-line position bridging the contacts 45a and 45b, thereby completing an energizing circuit through the coil of solenoid 51 from battery 50. This will cause the stop member 52 on the armature to move through the opening 12d in the housing 12 and into the forward path of movement of the plunger 25. When the plunger 25 is in the retracted position, one of the expendable temperature-sensing units 16 will be free to fall downwardly from the lower end of magazine 15 into the tubular housing 12. As the plunger 25 moves forward, the forward end of the body 18 of the temperature-sensing unit 16 will engage the stop member 52, and, thus, permit the plunger 25 to move the contacts 31 and 32 thereon into engagement with the corresponding contacts 23a and 24a on the expendable temperature-sensing unit 16.

After this operation is completed, the contacts 45 move out of engagement with contacts 45a and 45b, thereby opening the circuit in the solenoid 51 and causing the stop 52 to be retracted from the path of movement of the plunger 25 and the expendable temperature-sensing unit which has now been plugged into the forward end of plunger 25. The plunger 25 moves to the forward end of its stroke as shown in full-line in FIG. 1. At this time, the expendable temperature-sensing unit 16 is inserted into the opening in the wall 11 and the temperature measurement is made. After the temperature measurement is completed, which normally takes only a few seconds, the plunger 25 may be retracted, or such retraction may be delayed until it is desired to make another temperature measurement. The body 18 of the temperature measuring unit 16 will block the opening in the wall 11 until a succeeding measurement is desired.

Upon retraction of the plunger 25, it will be seen that the extension 46 will operate a normally-open switch 54, completing a circuit from battery 50 through conductors 55 and 56 to the coil of a solenoid 57 which is of the same type as solenoid 51 and includes a retractible stop member 58. Upon energizing the solenoid 57, the stop member 58 will move downwardly through the opening 12e in the housing 12 until it engages the coupling 27 carried by the forward end of the plunger 25. As the plunger 25 retracts, the stop 58 will enter the joint between the body 18 of the expendable temperature-sensing unit 16 and the coupling 27. This will cause the temperature-sensing unit 16 to be uncoupled or unplugged from the electrical connector on the plunger 25 while the latter is free to continue its retracting movement. The temperature-sensing unit 16 is permitted to fall through an opening 12f at the lower side of housing 12, as indicated by the discarded temperature-sensing unit 16' in FIG. 1. When the plunger 25 is moved to its fully retracted position as shown by the phantom lines in FIG. 1, the actuator 46 will have moved out of engagement with the switch 54, permitting the latter to move to its normally-open position, thereby deenergizing the solenoid 57 and retracting the plunger thereof which carries the stop 58. Thus, on the forward movement of the plunger 25, the stop 58 will be withdrawn from the path of movement of the plunger 25.

Referring to FIG. 3, the present invention has been illustrated in connection with a modification to provide a system for measuring the temperature of a hot fluid or molten bath, such as a bath of molten steel. In basic oxygen furnaces, it is frequently necessary to measure the temperature of the bath at repeated short intervals in order to accurately control the temperature of the molten steel being produced, as changes take place rapidly in such furnaces and satisfactory continuous measuring means have not yet been discovered. The system disclosed in FIG. 3 is adapted for such rapid successive temperature measurements. Heretofore no known attempts have been made to make a succession of temperature measurements through the wall of a furnace of this type. The present invention provides a method and apparatus which makes possible the taking of a succession of measurements in such a furnace.

As may be seen in FIG. 3, there is illustrated a wall 60 of a furnace, or similar container, for a molten bath 61. The inside of the wall 60 is lined with a refractory lining 62 of suitable material, such as refractory brick or the like. An opening 60a is provided through the wall 60 of the furnace, at least the outer end of such opening being above the level of the molten bath 61. The opening 60a is adapted to be provided with a tubular liner 63. The tubular liner 63 preferably is formed from a highly refractory ceramic composition, such for example as disclosed in Patent 3,091,119, Fischer et al. The exterior of the wall 60 is provided with a metal mounting plate 64 which in combination with the brackets 65 and 66 is adapted to support a tubular housing 67. The tubular housing 67 is provided with a magazine 68 for a supply of expendable thermocouple units 69 similar to the system shown in FIGS. 1 and 2 and additional refractory plug elements 80 later to be described. The discharge end of the tubular housing 67 is positioned in alignment with the opening through member 63 into the furnace. The housing 67 is provided with a reciprocable plunger 70 having a piston 71 which is adapted to reciprocate within a cylinder 72. The piston 71 is adapted to be fluid-operated from a suitable control station 73 having fluid lines 74 and 75 connected to the opposite ends of the cylinder 72. As in the previous embodiment, the control station 73 may be of any suitable type and is adapted for manual operation as well as for automatic operation from a programmer or computer. The control station 73 is of such type as to reciprocate the plunger 70 at predetermined intervals alternately to feed refractory plugs 80 and expendable temperature-sensing units 69 through the refractory tube 63 in the wall 60.

The expendable temperature-sensing units 69 are best shown in FIG. 4 and are similar in many respects to the units 16 described in connection with FIGS. 1 and 2. For example, it will be seen that the units 69 include thermocouple elements 19' and 20' each having an end joined to provide a measuring junction 21' within the quartz tube 22'. The opposite ends of the thermocouple elements 19' and 20' are connected to lead wires 23' and 24', the outer ends of which are bent back on a connector body element 78 to provide contacts 23a' and 24a' respectively. The quartz tube 22' is carried by a body member 76 which may consist in whole or in part of ceramic or other material as taught in the patents mentioned at the beginning of this specification. The body member 76 is provided with a metal protective cap 77 which protects the U-shaped tube 22' and the thermocouple contained therein during immersion into the molten bath 61. The cap 77 is of thin material so that it melts or is otherwise destroyed shortly after immersion in the molten bath 61. The contacts 23a' and 24a' are supported by another body member 78 which may be made of plastic material such as polystyrene or polyethylene to provide a resilient support for the contacts 23a' and 24a'. It is also understood that the body member 78 may be made from wood or equivalent material. Both of the body members 76 and 78 are adapted to be supported at the opposite ends of a cardboard tube having a length corresponding to the overall length illustrated by the expendable units 69 shown in magazine 68. The construction of the expendable thermocouple units 69, shown in FIG. 4, is similar to the units shown in the aforesaid group of patents and no claims to such constructions per se are made herein.

Referring to FIG. 3, it will be seen that the magazine 68 not only contains a series of expendable temperature-sensing units 69, but it also contains a series of refractory plugs 80, one of which plugs 80 is shown inserted in the opening through the tubular member 63 in the wall 60 of the furnace. The refractory plugs 80 are provided as means to plug the opening in the tubular member 63 prior to and between temperature measurements to prevent blockage of or damage to the refractory liner 63. As pointed out in the aforesaid patent 3,091,119, it is necessary to take precaution to prevent plugs of this type from becoming sintered to the masonry lining 62 of the furnace. This may be accomplished in various ways. The plug 80 may be made of a porous mixture of a highly refractory ceramic substance with a cement and binding agent melting at the temperature of the masonry and with a substance which evolves gas at such temperature. Suitable as a highly refractory ingredient of the plug mixture are magnesite, burned dolomite, lime, magnesia, corundum, silica or quartz. Waterglass, phosphorus acid or boric acid are suitable as cementing and binding agents. Examples of additives which give off gas at the temperature of the masonry are wood chips, granular plastic compositions and the like, all as more fully disclosed in the aforesaid Patent 3,091,119. Where the plugs 80 are gas-impervious, they have a diameter somewhat smaller than the passage in tubular member 63, thereby defining a narrow annular passage for gas between the plug 80 and the member 63. The gas is provided from a suitable supply indicated by tank 81. The gas is an inert gas, such as argon, and is adapted to be injected under pressure. The plugs 80 may also have a diameter to fit the tubular passage 63, and under such circumstances are provided with longitudinal slots forming the inner ends of pathways for the gas. The foregoing details of construction of the plugs 80 do not form part of the present invention.

The forward, i.e., the downwardly disposed, end of each of the plugs 80 is provided with a reduced cross-section 80a which is adapted to be received in the rear, i.e., the upwardly disposed, end of a tubular member 82. The tubular members 82 preferably comprise cardboard tubes similar to the tube 79 shown in FIG. 4. The cardboard tubes 82 serve as spacers to extend the length of the refractory plugs 80 to the full length of the magazine 68. When a refractory plug 80 and mating tube 82 are inserted through the opening in the wall 60, the tube 82 will be rapidly consumed in the furnace while the refractory plug 80 will be retained in the opening in tubular member 63 to plug the opening in the furnace as shown in FIG. 3 and prevent obstruction thereof or damage thereto by the molten metal in the furnace. The rear ends of the fractory plugs 80 are provided with a counterbore 80b which is adapted to receive the extending portion of the metal cap 77 as shown in FIG. 4, and as now to be described.

The forward end of the plunger 70 is provided with plug-in contact structure similar to the contact structure shown in FIG. 2 in the forward end of plunger 25. Such contact structure is adapted to receive the contacts 23a' and 24a' on the expendable unit 69 shown in FIG. 4. The plunger 70 is provided with a cable 35 extending therethrough from its contact end to the recorder 36. When pressure is applied through line 75, the piston 71 moves upwardly to the right to retract the plunger 70. When the piston 71 has moved to the upper end of cylinder 72, an expendable temperature-sensing unit 69 will feed from the magazine 68 into the tubular housing 67. When the controller 73 applies pressure through line 74 to cylinder 72, the piston 71 will be moved to the left in a downward direction, moving the plunger 70 into engagement with the contact end of the temperature-sensing unit 69. A mechanical stop 83 is adapted to engage the forward end of the temperature-sensing unit 69 adjacent the cap 77 at the end of tube 79. The stop 83 is biased inwardly by a tension spring 84 which is carried in a chamber 85 depending from the tubular housing 67. The stop 83 is adapted to apply a sufficient force to the temperature-sensing end of the expendable temperature-sensing unit 69 to permit the contacts 23a' and 24a' to be engaged by the mating contacts on the plug-in electrical connector carried by the forward end of the plunger 70. Upon continued movement of the plunger 70, the cap 77 on the expendable temperature-sensing unit 69 will move into the counterbore 80b at the rear end of plug 80 in the manner shown in FIG. 4. The counterbore 80b has a depth and diameter sufficient to prevent damage to the cap 77. Continued forward movement of the plunger 70 will cause the refractory plug 80 to be forced into the molten bath 61 and permit the temperature-sensing end of the expendable unit 69 to be immersed below the level of the molten bath 61 for a temperature measurement thereof. Following such measurement, the plunger 70 is adapted to be retracted, at which time the pivoted stop 86 will strip the expended unit 69 from the contact end of the plunger 70. When the plunger 70 is in its fully-retracted position, another refractory plug 80 and associated cardboard tube 82 will drop from the magazine 68 into the housing 67 preparatory to being fed into the position of the plug 80 shown in FIG. 3.

In regard to the position of the magazine 15 in FIG. 1 and the magazine in FIG. 3, it is preferable that they be disposed at an angle of approximately 45° with respect to the plane of the paper. This aids in feeding the units from the magazine to the tubular housings 12 and 67 respectively. While the magazine 68 in FIG. 3 has been illustrated as containing both the expendable temperature-sensing units 69 and the expendable plug units 80–82, it is to be understood that separate magazines for these elements may be used, one disposed at either side of the tubular housing 67 to feed the units as desired. Thus, if two temperature measurements are desired in rapid succession, the housing containing the temperature-sensing unit will discharge two of such units in succession before another plug unit is discharged from the other housing. It is also to be understood that the temperature-sensing unit may be combined with the expendable plugs 80. In such an arrangement, the expendable temperature-sensing unit wiuld form the forward portion 82 of the composite unit while the plug 80 would form the rear portion. The contact support 78 shown in FIG. 4 would then be carried at the rear end of the plug 80 and the lead wires 23' and 24' would extend through the plug. For example, the lead wires 23' and 24' could be molded into the refractory plug during its manufacture. Water-cooled contacts may be provided in the region of the tubular 63, FIG. 3, if deemed desirable to prevent undue rise of temperature of the plug-in contacts should the plunger 70 be allowed to remain in the position shown for an extended period of time.

It is to be understood that the present invention is not limited to the specific arrangements described and illustrated, but further modifications thereof may be made within the scope of the appended claims.

What is claimed is:

1. A system for making a series of temperature measurements at selected intervals comprising:
   a tubular housing an opening in the side wall thereof intermediate the ends of said housing and adapted to receiver expendable temperature sensing units, one of said ends of said housing comprising a discharge end,
   a magazine for a supply of expendable temperature sensing units supported adjacent said housing, said magazine having a discharge opening in communication with said opening in said side wall of said housing to feed the expendable temperature sensing units in sequence into said housing,
   a reciprocable plunger within said housing,
   eletrical connector means carried by said plunger at the end thereof adjacent said discharge end of said housing and adapted to engage complementary electrical connector means on the expendable temperature sensing units,
   means for connecting said electrical connector means on said plunger with a temperature measuring circuit, and
   stop means positioned along the path of movement of said electrical connector means carried by said plunger,
   said stop means being engagable in sequence with the expendable temperature sensing units to effect engagement and disengagement of the connector means on the units with said electrical connector means on said plunger during reciprocating movement of said plunger for electrical connection and disconnection of the expendable temperature sensing units in sequence with the temperature measuring circuit.

2. A system for making a series of temperature measurements according to claim 1 wherein said stop means comprises retractable stop structures adapted for movement into and out of the path of movement of the expendable temperature sensing units.

3. A system for making a series of temperature measurements according to claim 2 including means for controlling the operation of said retractable stop structures.

4. A system for making a series of temperature measurements according to claim 1 including means for controlling the reciprocation of said plunger.

5. In a system for making a series of temperature measurements of a molten bath in a container, the method comprising the steps of
   feeding an expendable temperature sensing unit into a housing communicating with an opening in the wall of the container above the molten bath,
   connecting the temperature sensing unit with a temperature measuring system,
   inserting the temperature-sensitive end of the temperature sensing unit through the opening in the wall and into the molten bath for a temperature measurement thereof,
   disconnecting the temperature sensing unit from the measuring circuit,
   inserting a refractory plug into the housing behind the temperature sensing unit,
   moving the refractory plug into the opening in the wall of the container to force the temperature sensing unit through the opening and into the molten bath and to plug the opening, and
   alternately introducing additional temperature sensing units and refractory plugs into the housing for making succeeding temperature measurements of the molten bath.

6. The method according to claim 5 including the step of introducing an inert gas into the housing while a refractory plug is inserted in the opening in the wall of the container.

7. A system for making a series of temperature measurements of material within a container comprising:
   a tubular housing;
   means for attaching said housing in supported relation with an opening in a container containing material the temperature of which is to be measured,
   a plunger reciprocable within said housing,
   plug-in electrical connector means carried by said plunger at an end thereof disposed in said housing,
   means for inserting an expendable temperature-sensing element having a plug-in electrical connector engageable with that of said plunger into said housing and into the path of said reciprocable plunger, and
   means associated with said housing to control engagement and disengagement of said plug-in connectors in accordance with the direction of travel of said plunger.

8. A system for making a series of temperature measurements according to claim 7 wherein said means for inserting an expendable temperature-sensing element includes a magazine supported with a feed portion thereof adjacent said tubular housing for depositing expendable temperature-sensing elements one at a time into said housing.

9. A method for measuring the temperature of material within a container having an access opening therein and tubular housing means supported in communicating relation with said opening comprising the steps of:

plugging said opening with removable means to plug said opening prior to a time when the temperature of said container and the material therein can damage said opening, subsequently pushing an expendable temperature-sensing device through said housing to dislodge said means to plug said opening, continuing to push said sensing device through said opening until the sensing portion thereof is in a temperature measuring position and a portion thereof effects plugging of said opening, thereafter measuring the temperature of the material in said container, and replacing said temperature-sensing device when necessary, while at all times maintaining means to plug said opening in said container to prevent damage thereto.

References Cited

UNITED STATES PATENTS

| | | |
|---|---|---|
| 2,805,273 | 9/1957 | Cuthbert. |
| 2,999,121 | 9/1961 | Mead. |
| 3,007,340 | 11/1961 | Kraftson _____ 73—432 |
| 3,024,295 | 3/1962 | Moore. |
| 3,038,951 | 6/1962 | Mead. |
| 3,048,642 | 8/1962 | Parker. |
| 3,055,961 | 9/1962 | Robertson et al. |
| 3,091,119 | 5/1963 | Fischer et al. |
| 3,327,531 | 6/1967 | Fradeneck _____ 73—359 |

DAVID SCHONBERG, *Primary Examiner.*

LOUIS R. PRINCE, *Examiner.*

N. B. SIEGEL, *Assistant Examiner.*